Nov. 1, 1960 L. LONNQVIST 2,958,793
ELECTRIC MOTOR
Filed Nov. 23, 1956 2 Sheets-Sheet 1
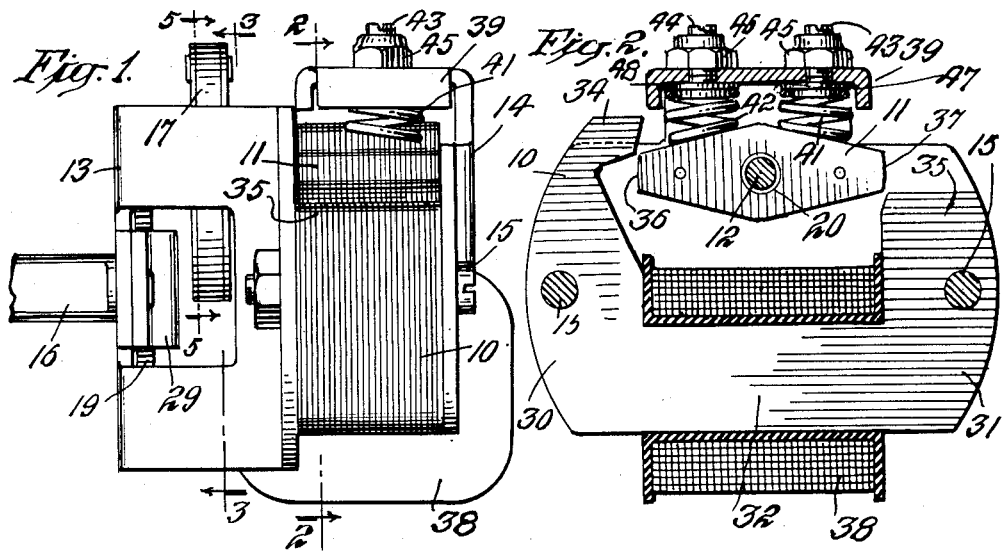
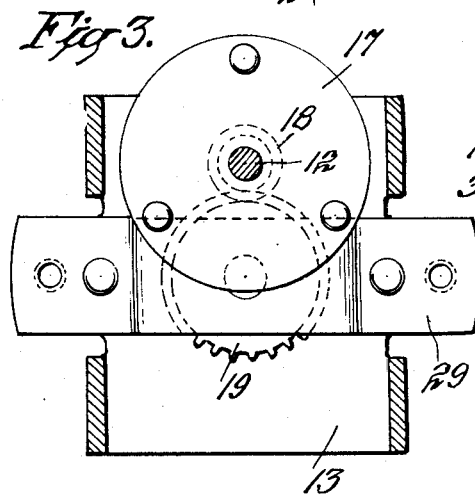
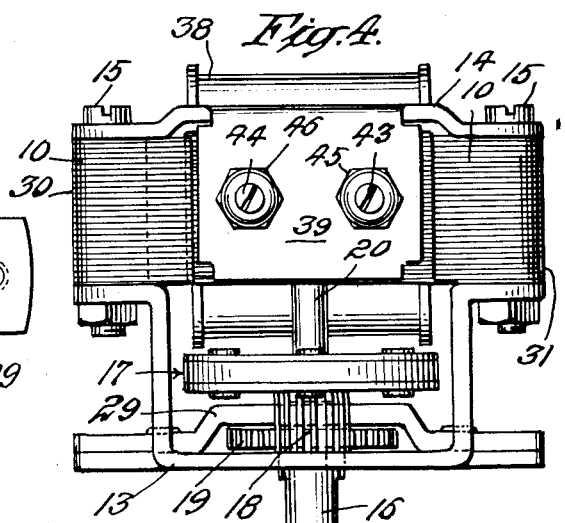
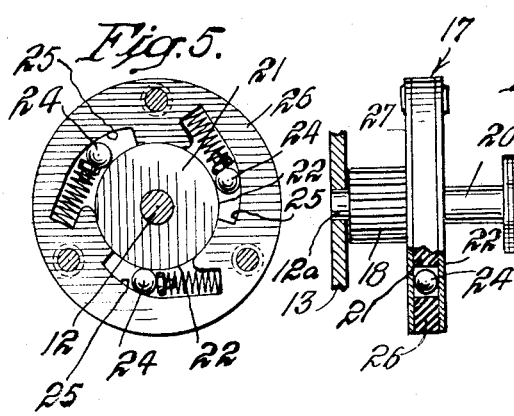
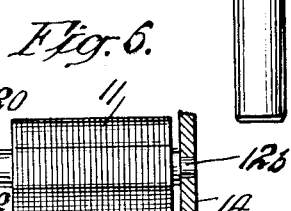
INVENTOR.
LARS LONNQVIST
BY
Frank A. Bower
ATTORNEY Nov. 1, 1960
L. LONNQVIST
2,958,793
ELECTRIC MOTOR
Filed Nov. 23, 1956
2 Sheets-Sheet 2
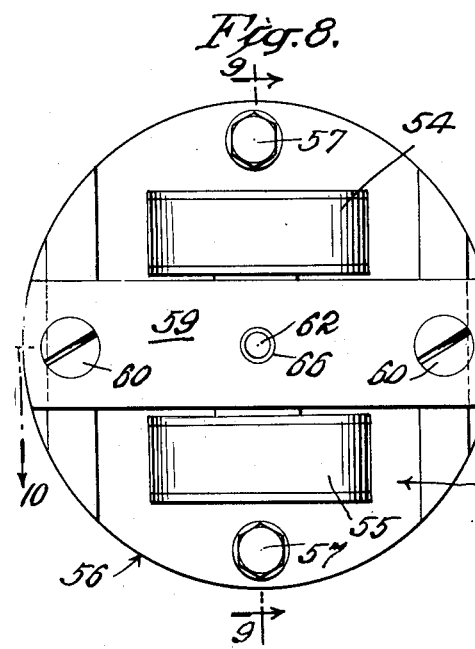
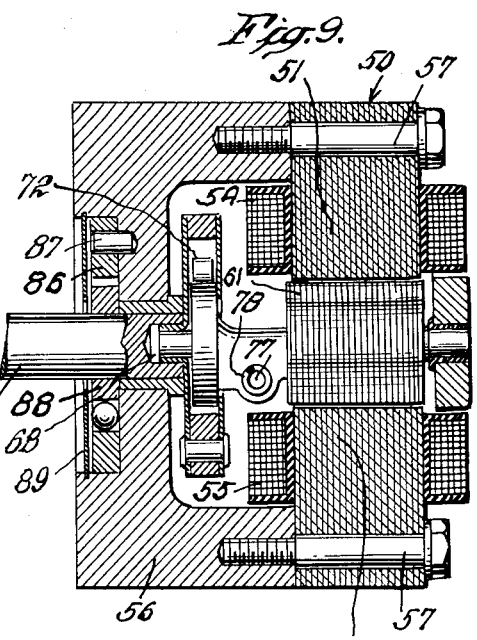
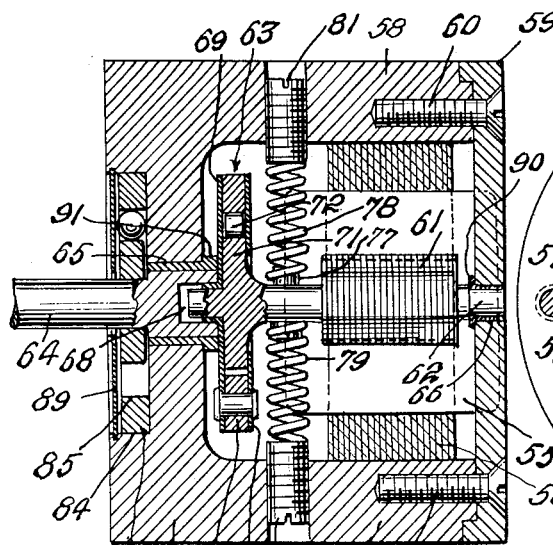
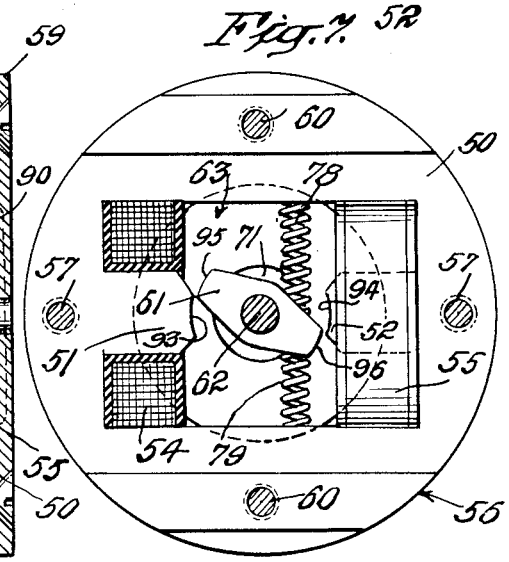
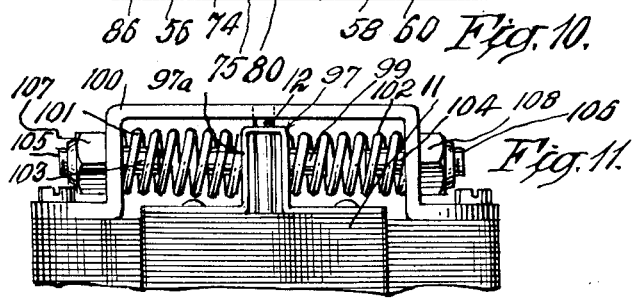
INVENTOR.
LARS LONNQVIST
BY
Frank A. Bower
ATTORNEY

United States Patent Office

2,958,793
Patented Nov. 1, 1960

2,958,793

ELECTRIC MOTOR

Lars Lonnqvist, East Orange, N.J., assignor to The Viking Tool & Machine Corporation, Belleville, N.J., a corporation of New Jersey Filed Nov. 23, 1956, Ser. No. 623,988

1 Claim. (Cl. 310—37)

This invention relates to low wattage prime movers, and particularly to low wattage prime movers having a vibrating armature delivering power to a rotatable shaft through means converting the vibrating motion to a unidirectional rotary motion.

It is an object of this invention to provide a small low wattage motor that has a high torque for rotating or actuating various types of equipment. It is a further object of this invention to provide a motor of this type that operates efficiently and has relatively few parts in order to reduce the cost of manufacture and assemblage.

A further and different object is to provide a vibratory armature-type motor that will operate on current having a frequency of 400 cycles/second and having a high torque output.

In the following description of the various embodiments of the invention, the dynamic members may be operated over a wide range of frequencies and at the particular frequencies of 60 cycles per second and 400 cycles per second. The electromagnet must be adapted to the various frequencies for proper operation.

In the drawings:

Fig. 1 illustrates a side view of one embodiment of the invention.

Fig. 2 is a sectional view of the armature and pole pieces of the motor taken along lines 2—2 of Fig. 1.

Fig. 3 is another sectional view of the transmission end taken along lines 3—3 of Fig. 1.

Fig. 4 is a top view of the embodiment in Fig. 1.

Fig. 5 is a sectional view of the clutch taken along lines 5—5 of Fig. 1.

Fig. 6 is a fragmentary view of the armature and transmission.

Figs. 7 and 8 are end views of another embodiment.

Figs. 9 and 10 are sectional views of the pole pieces and transmission taken along lines 9—9 and 10—10 of Fig. 7, respectively.

Fig. 11 is a fragmentary view of another embodiment of the resilient means for returning the armature of the embodiment in Fig. 1.

The motor shown in Figs. 1-6 comprises a laminated stator 10 with an armature 11 mounted on a shaft 12. The shaft 12 is supported by a frame comprising a U-shaped member 13 and an L-shaped member 14. The frame members are secured to the stator by fastening means 15 to form a rigid stationary supporting structure. The armature 11 is press fitted on a sleeve 20 which is connected to the output shaft 16 through a clutch 17, stud gear 18 and a main gear 19 rigidly secured to the shaft 16. The clutch 17 drives the gears 18 and 19 in shaft 16 in one direction and releases from engagement on reversal of the rotation of the armature. Thus, a vibratory or oscillatory movement of the armature transmits an intermittent, unidirectional movement to the shaft 16.

The clutch 17 is of a conventional design and comprises a flange 21 formed as a single piece with the sleeve 20. The flange has a clutch surface 22 for engaging the spring-held rollers 24 to wedge the rollers against the surface 25 on the cam member 26. The cam member 26 is secured to the stud gear 18 by the plate 27. The sleeve 20, clutch 17 and stud gear 18 are rotatably mounted on the shaft 12 which has knurled ends 12a and 12b fitted in knurled holes in the frame members 13 and 14 to secure the shaft 12 against rotation. The output shaft 16 is supported by the frame member 13 and the strap 29, with the gear 19 positioned between the frame member 13 and the strap 29 to hold the gear in engagement with the gear 18.

The stator 10 comprises laminated ferromagnetic steel and has a generally U-shape comprising leg portions 30 and 31 and a center or connecting portion 32. An electromagnetic coil 38 is wound around the center portion 32 and passes alternating electric current to create a magnetic flux in the stator. The frame members 13 and 14 are made of non-magnetic material to confine the metal flux path to the stator and the armature. The leg portion 30 is longer than the leg portion 31 so that the pole piece 34 is further from the center portion 32 and on a line diametrically opposite to the poles 35 through the shaft 12. The armature 11 is of a generally rectangular shape with converging or sloping sides to form rounded end surfaces 36 and 37. The armature 11 is positioned on the shaft 12 so that the surface 36 is below the pole piece 34 and the surface 37 is above the pole piece 35 when positioned in a generally parallel relation to the central portion 32.

The frame member 14 has a mounting 39 extending generally normal to the frame member 14 and generally coextensive with the armature 11. The mounting 39 has bolts 43, 44 threaded in the mounting member and locked in position by nuts 45, 46. The helical springs 41, 42 are mounted in spring seats 47, 48 fastened to the bolts 43, 44 and positioned to engage the armature on opposite sides of the shaft 12 so that the springs are alternately compressed on vibration of the armature. The springs 41, 42 determine the static position of the armature and the amplitude of the dynamic vibration. The compression of the springs and the position of the armature may be adjusted by varying the setting of the bolts 43, 44.

On passage of current through the coil 38, an alternating flux is created in the stator 10 which causes the armature 11 with the sleeve 20 to move in overlapping relation with pole surfaces 34a and 35a of the pole pieces 34 and 35. On the cessation of the flux, the spring 41 reverses the rotation of the armature 11 and moves it out of alignment between the pole pieces 34 and 35 before the next half cycle of flux appears between the pole pieces 34, 35. The bolts 43, 44 form a means for adjusting the compression of the springs 41, 42 and the amplitude of the vibration or swing of the armature 11. This adjustment of the compression of the springs 41, 42 provides a means for adjusting the speed of rotation of the output shaft 16, since it varies the amplitude of the armature 11. Since the rate of vibration of the armature 11 is determined by the frequency of the current supplied to the winding 38, the amount that the shaft 16 is rotated on each actuation of the shaft 11 limits the speed that the shaft is rotated. The setting of the bolts 43, 44 also provides a means to adjust the torque available on the output shaft. The position of the arc of the armature determines the torque applied to the shaft. On an actuating stroke, the armature 11 drives the sleeve 20, the clutch 17, stud gear 18, gear 19 and the output shaft 16. On the return or non-actuating stroke, the armature 11 and the sleeve 20 with the flange 21 are rotated. Thus, the mass to be moved on the return stroke comprises the armature 11 and the sleeve 20 with the flange 21. The sleeve 20 and the flange 21 may comprise a light aluminum alloy. The helical springs impress balanced opposite rotational forces to the armature 11 to hold the armature slightly off from an overlapping relation with the pole pieces for highest torque. This position may be changed to decrease the torque and thus give a range of torques. The low mass of the sleeve, due to the lightness of the metal and the fact that it is hollow to rotate on a shaft, and the small inner clutch flange 21 reduce the inertia of the moving parts and permit a quick response to the flux of the stator. The springs can be left in pressure, since the armature and sleeve are of low inertia. This increases the efficiency of the motor by reducing the absorption of energy in operating the motor. The armature can then be rapidly returned while the back torque and gearing hold the shaft 16 in its unidirectional rotated position. The flange 21 disengages from the rollers 24 and clutch member 26 to permit the free return of the armature without reversing the direction of rotation of the shaft 16. Thus, the motor has a very rapid action with a high torque for its size and weight.

In the embodiment shown in Figs. 7–10, a motor is provided with a rectangular shaped stator 50 having pole pieces 51 and 52 in the opening 53 of the stator. Electromagnetic windings 54, 55 are provided on the pole pieces 51 and 52, respectively, to provide a flux between the pole pieces. The stator 50 is mounted on a frame or base 56 by means of the bolts 57. The stator 50 fits between side pieces 58 of the base or frame 56 for holding the strap 59 secured to the side pieces by the bolts 60.

The dynamic assembly is supported by the base 56 and the strap 59 and comprises an armature 61, a shaft 62, a clutch 63 and an output shaft 64. The output shaft 64 is rotatably mounted in a bushing 65 and the shaft 62 is rotatably mounted in the bushing 66 in the strap 59 at one end and in a bushing 67 formed on the plate 69 secured to the clutch 63. The bushing fits in the cylindrical recess 68 in the shaft 64 and it is fused with the output shaft to form an integral piece and to secure the plate 69 to the shaft 64. The shaft 62 has a flange 71 for engaging the rollers 72 mounted in the cam member 74 of the clutch. A plate 75 is secured to the cam member 74 to hold the rollers in the cam slots. The dynamic means operate similarly to the previous embodiment. The shaft 62 has an extension 76 with an opening for passing a sleeve 77 therethrough. The sleeve 77 extends laterally to the shaft 62 and has helical springs 78 and 79 mounted thereon and supported by adjusting screws 80 and 81 threaded in the base 56. The adjusting screws 80, 81 vary the compression of the springs 78 and 79 for providing a range of torque and speed.

The base 56 has a cylindrical recess 84 for receiving a clutch 85. The clutch 85 is positioned to grip and hold the shaft 64 from reversing in direction on the reversal or return movement of the armature 61. This ensures that the shaft 64 has a unidirectional rotatable movement and does not tend to reverse in direction due to the inertia and friction of the parts. The clutch 85 has a cam member 86 secured against rotation by circumferentially spaced pins 87 fitting through openings in the cam member 86 and into the base 56. Clutch member 88 is secured to and rotates with the shaft 64. On the return stroke of the armature the cam squeezes the balls against the cam member 86 to lock the shaft 64 against the reverse rotation. The clutch 85 is retained in the slot 84 by a resilient disk-shaped member 89 fitting in a groove in the walls of the recess 84.

The armature 61 is press fitted on the shaft 62 of the assembled clutch 63. The journal of the shaft 64 fitting in the bearing 65 has a larger diameter than the shaft 64 to accommodate the recess 68. The bearing 67 is fused by welding or soldering to the inner surface of the recess 68 connecting the output shaft to the cam member 74 for transmission of power. The dynamic mechanism is assembled and inserted into the base 56. The strap 59 with the bearing 66 is fitted on the reduced end of the shaft 62 to support the dynamic mechanism. The bearing 66 has a flange or a collar 90 to receive the pressure of the shaft 62. The strap 59 is secured in place by the bolts 60 and the dynamic assembly is held against axial movement by the bearing 66 and the shoulder of the shaft 62 at one end, and the plate 69 against the flange 91 of the bearing 65 at the other end. The plate 75 of the clutch 63 extends radially inward to overlap the flange 71 on the shaft 62 to securely hold the flange 71 in the clutch 63. The clutch 85 is then fitted on the shaft 64 into the recess 84 and the pins 87 forced in place to lock the clutch 85 against rotational movement, and the resilient disk 89 is snapped in place to hold the clutch 85 in the recess 84. The springs 78, 79 are fitted through the threaded openings in the base 56 and seated on the sleeve 77. The set screws 80, 81 are threaded in the openings and fitted against the springs 78, 79 to adjust the compression of the springs.

The armature 61 is fitted on the shaft 62 so that when the dynamic assembly is in position, the armature 61 is at an angle to the center line of the pole pieces 51, 52. The pole pieces 51, 52 have curved opposing surfaces 93, 94 and the armature 61 has curved surfaces 95, 96. In the non-actuating position, the surfaces 95, 96 do not overlap or only overlap slightly with the respective surfaces 93, 94. On energization of the coil 54, 55 by an alternating current, the flux between the poles 51, 52 causes the armature 61 to rotate so that the surfaces 95, 96 overlap with surfaces 93, 94. The compression of the springs 78, 79 is adjusted to control the amplitude of the vibration of the armature 61, and thereby the torque and speed of the armature 61.

In Fig. 11 a modification of the resilient means of the embodiment shown in Figs. 1–6 is illustrated. In this embodiment, instead of having the helical springs side by side as illustrated in Fig. 2, the helical springs are axially aligned in a manner similar to the embodiment illustrated in Fig. 10. A stamped metal piece 97 is secured to the end of the armature 11 and has a U-shaped portion 97a at the center of the armature. The shaft 12 extends through an opening in the U-shaped member 97a. Below the shaft 12, a transverse pin 99 extends through the side of the U-shaped portion 97a. The end frame member 100 is U-shaped to accommodate the helical springs 101, 102 fitting on the projecting ends of the transverse pin 99 and fitting in seats 103, 104 secured to bolts 105, 106. The bolts 105, 106 are locked in position by nuts 107, 108. This provides for a simpler means for mounting the resilient means on the motor. The dynamic means of the various embodiments may be adapted to operate over a range of frequencies by changing the design of the electromagnets 38, 54 and 55. When the motor is adapted to operate at 400 cycles per second, a one-half wave rectifier is connected in series with the windings to supply the electromagnet with pulses at a rate of 400 cycles per second. The rectification of the current provides a non-energization period to permit the dynamic means to recover before the application of the next energization cycle.

Various modifications may be made in the foregoing embodiments without departing from the scope of the invention as set forth in the claim.

I claim:

A prime mover comprising frame means, an input and output shaft rotatably mounted in said frame means, roller clutch means coupling said input and output shaft to rotate said output shaft in one direction, a stator mounted on said frame having a central portion with an electromagnetic coil wound there-around and two pole pieces having pole faces at different distances from said central portion with one pole face on a level above said input shaft and the other pole face on a level below said input shaft, an armature integral with said input shaft and when in a level position being out of alignment with said pole faces, mounting means on said frame means extending parallel to said armature in the level position and having adjustable resilient means engaging said armature for holding it out of alignment with said pole face and on energization of said electromagnetic coil responding to permit movement of said armature into an overlapping relation iwth said pole faces to apply a torque to said input shaft for rotating said output shaft by means of said roller clutch.

References Cited in the file of this patent

UNITED STATES PATENTS

| | | |
|---|---|---|
| 1,733,872 | Graseby | Oct. 29, 1929 |
| 2,211,053 | Critchfield | Aug. 13, 1940 |
| 2,731,005 | Lausen | Jan. 17, 1956 |
| 2,741,712 | Lonnqvist | Apr. 10, 1956 |
| 2,776,404 | Caldecourt | Jan. 1, 1957 |